Figure 25:
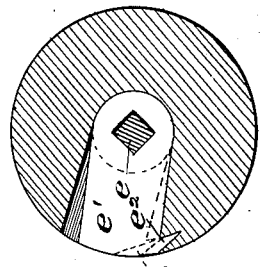

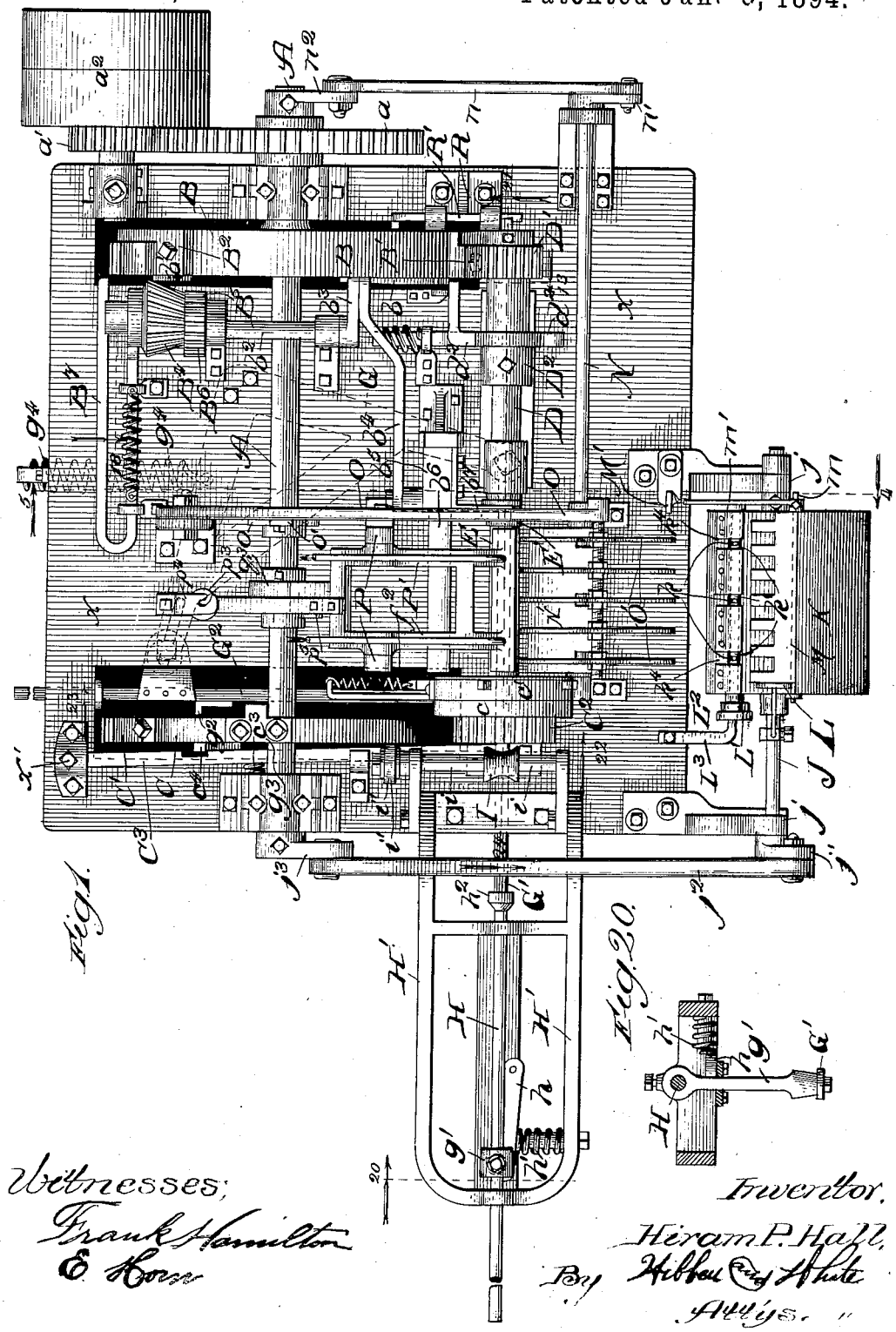

(No Model.) 9 Sheets—Sheet 2.
H. P. HALL.
APPARATUS FOR AUTOMATICALLY MANUFACTURING SHELLS FOR DYNAMITE.
No. 520,922. Patented June 5, 1894.
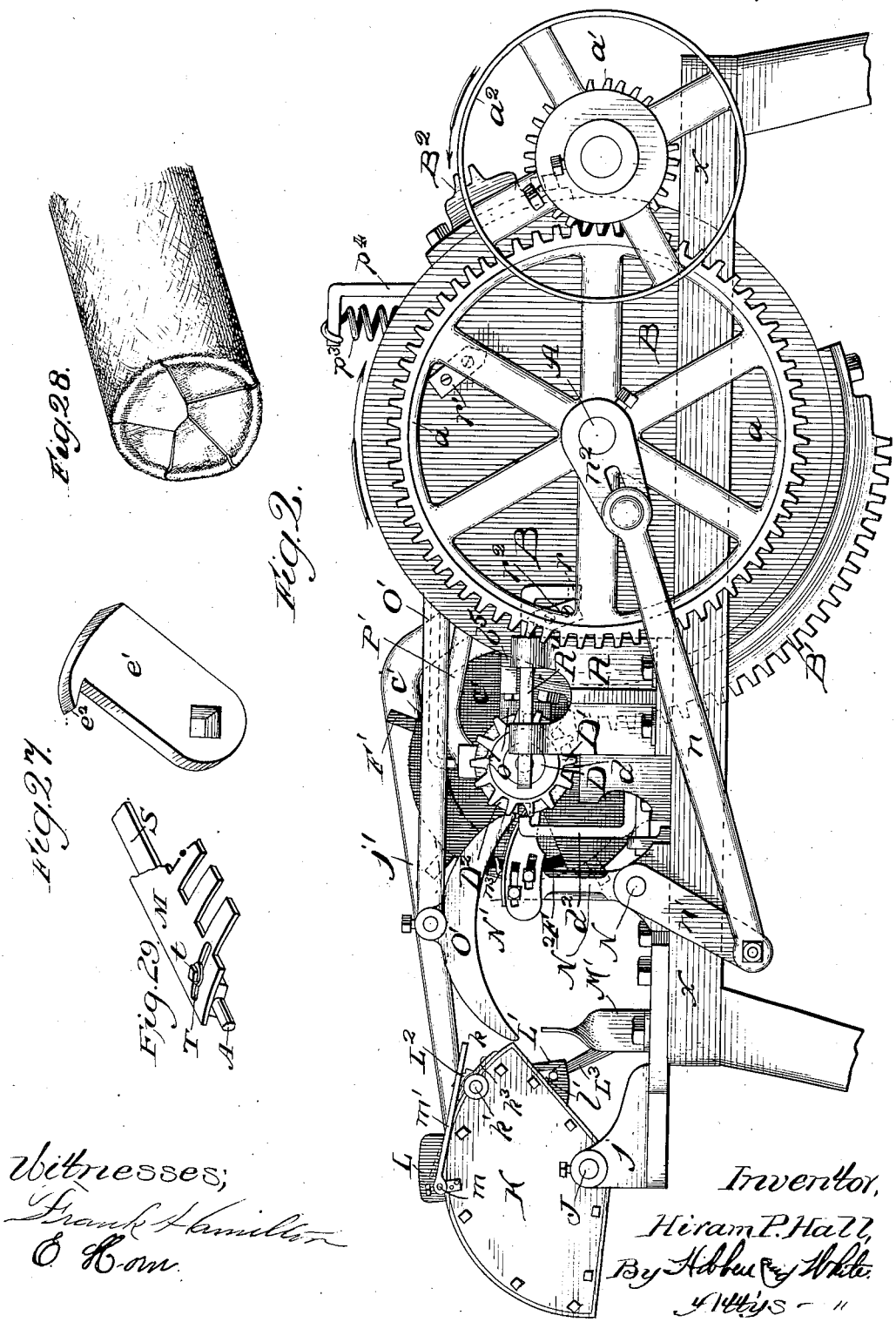

(No Model.) 9 Sheets—Sheet 3.

H. P. HALL.
APPARATUS FOR AUTOMATICALLY MANUFACTURING SHELLS FOR DYNAMITE.

No. 520,922. Patented June 5, 1894.

Witnesses: Frank Hamilton, C. Storm

Inventor: Hiram P. Hall
By Hibbard & White
Attys.

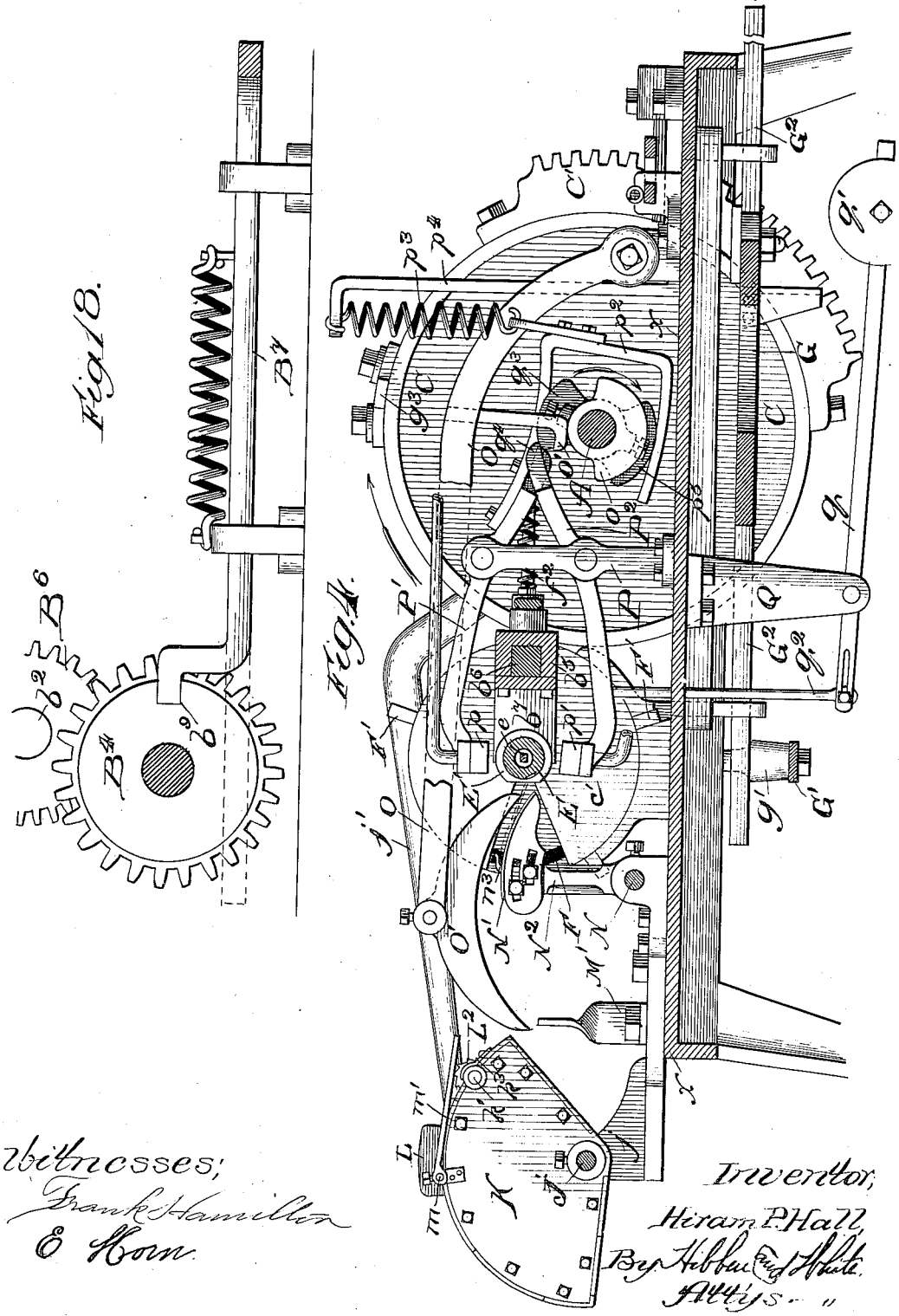

(No Model.) 9 Sheets—Sheet 5.
H. P. HALL.
APPARATUS FOR AUTOMATICALLY MANUFACTURING SHELLS FOR DYNAMITE.
No. 520,922. Patented June 5, 1894.
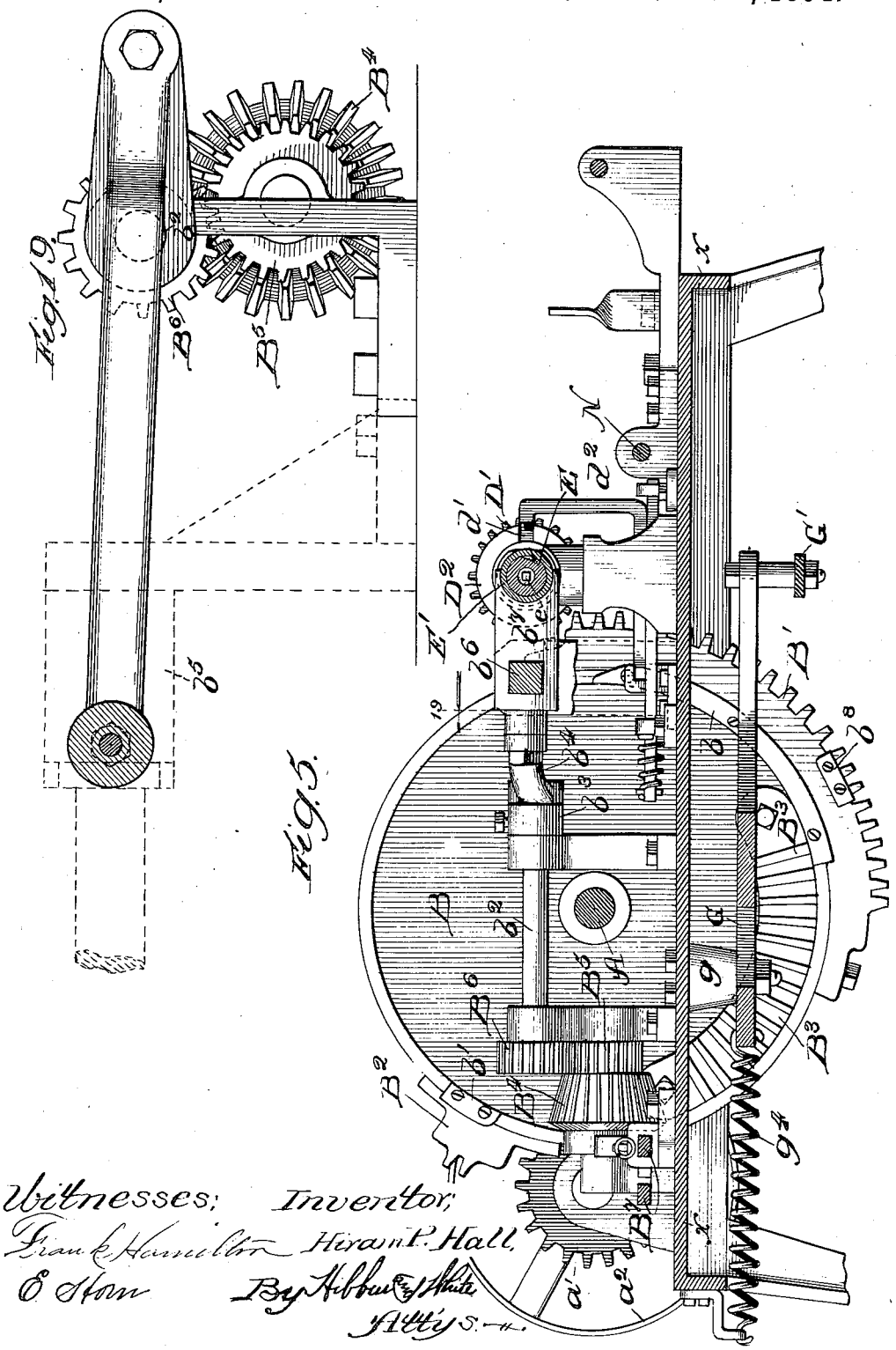

(No Model.) 9 Sheets—Sheet 6.
H. P. HALL.
APPARATUS FOR AUTOMATICALLY MANUFACTURING SHELLS FOR DYNAMITE.
No. 520,922. Patented June 5, 1894.
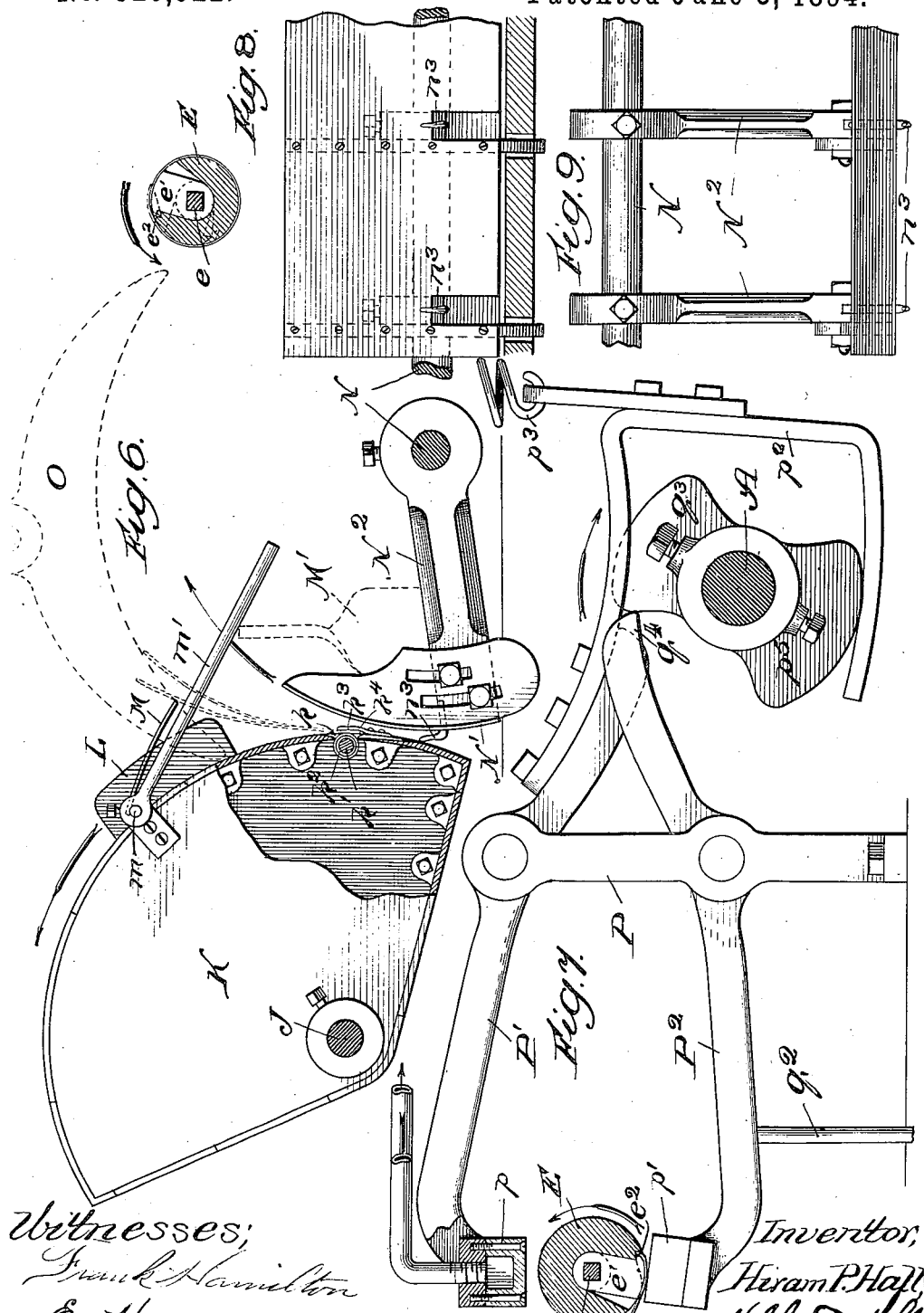
Witnesses:
Frank Hamilton
E. Horn
Inventor,
Hiram P. Hall
By Hubbard & Hill
Att'ys (No Model.) 9 Sheets—Sheet 7.
H. P. HALL.
APPARATUS FOR AUTOMATICALLY MANUFACTURING SHELLS FOR DYNAMITE.
No. 520,922. Patented June 5, 1894.
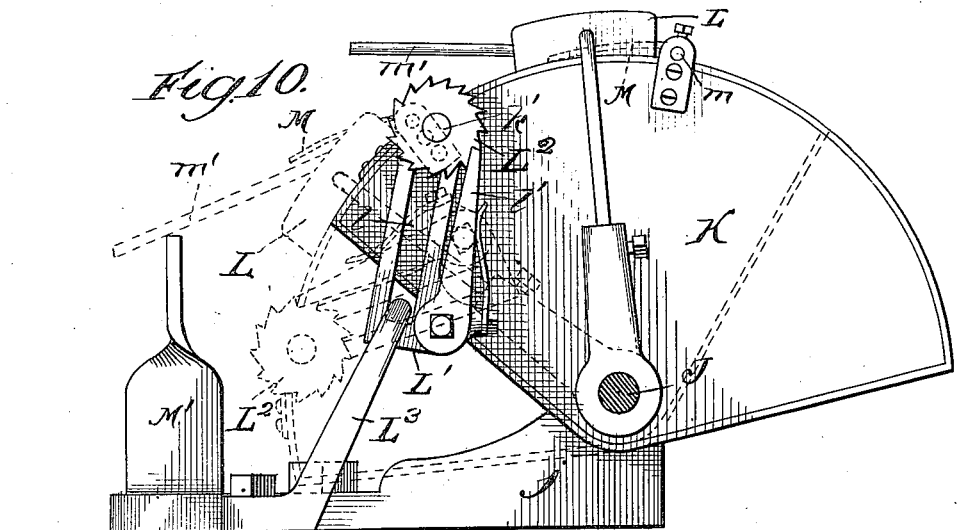
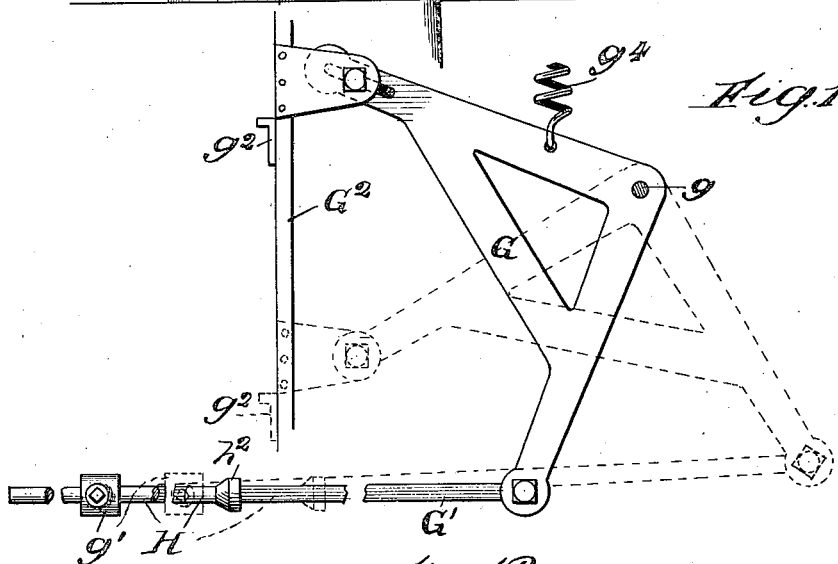
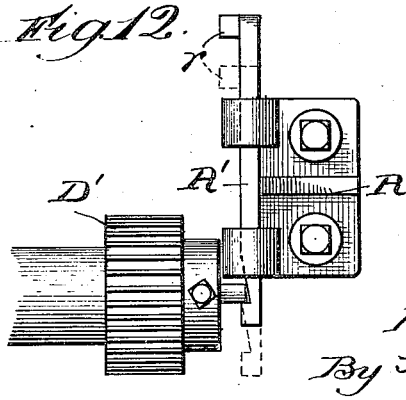
Witnesses;
Frank Hamilton
E. Storm
Inventor;
Hiram P. Hall
By Hibben & White
Attys (No Model.) 9 Sheets—Sheet 8.
H. P. HALL.
APPARATUS FOR AUTOMATICALLY MANUFACTURING SHELLS FOR DYNAMITE.
No. 520,922. Patented June 5, 1894.
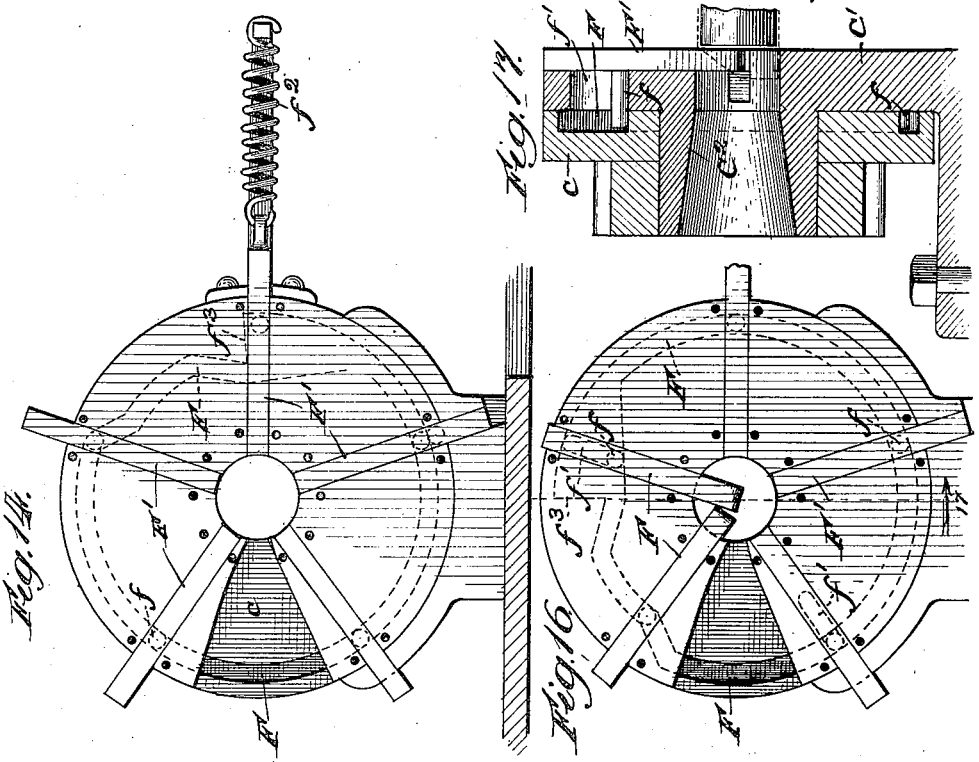
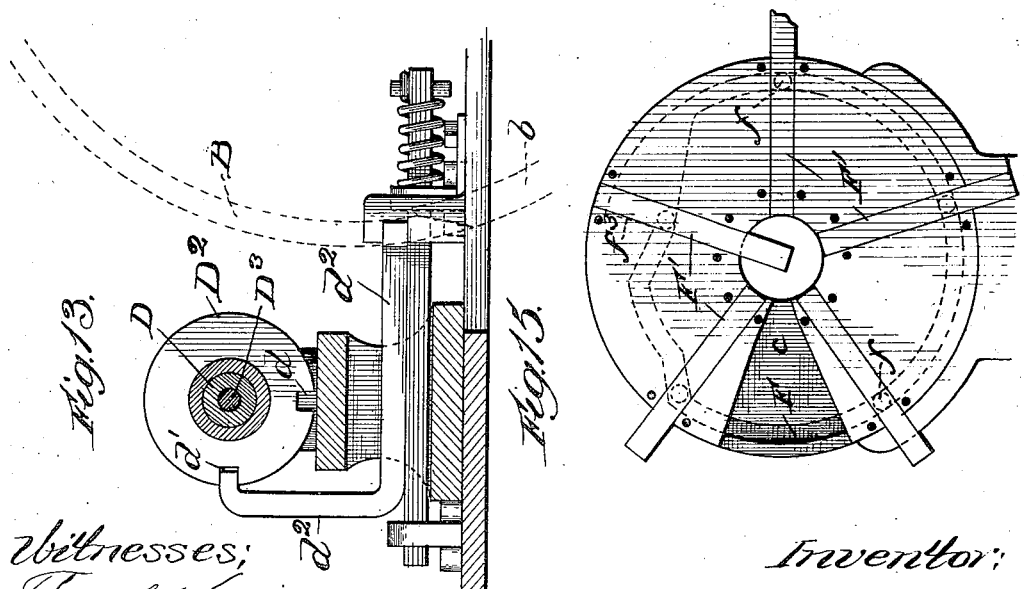
Witnesses:
Frank Hamilton
E. Storn
Inventor:
Hiram P. Hall,
By Hibben & White
Attys (No Model.) 9 Sheets—Sheet 9.
H. P. HALL.
APPARATUS FOR AUTOMATICALLY MANUFACTURING SHELLS FOR DYNAMITE.
No. 520,922. Patented June 5, 1894.
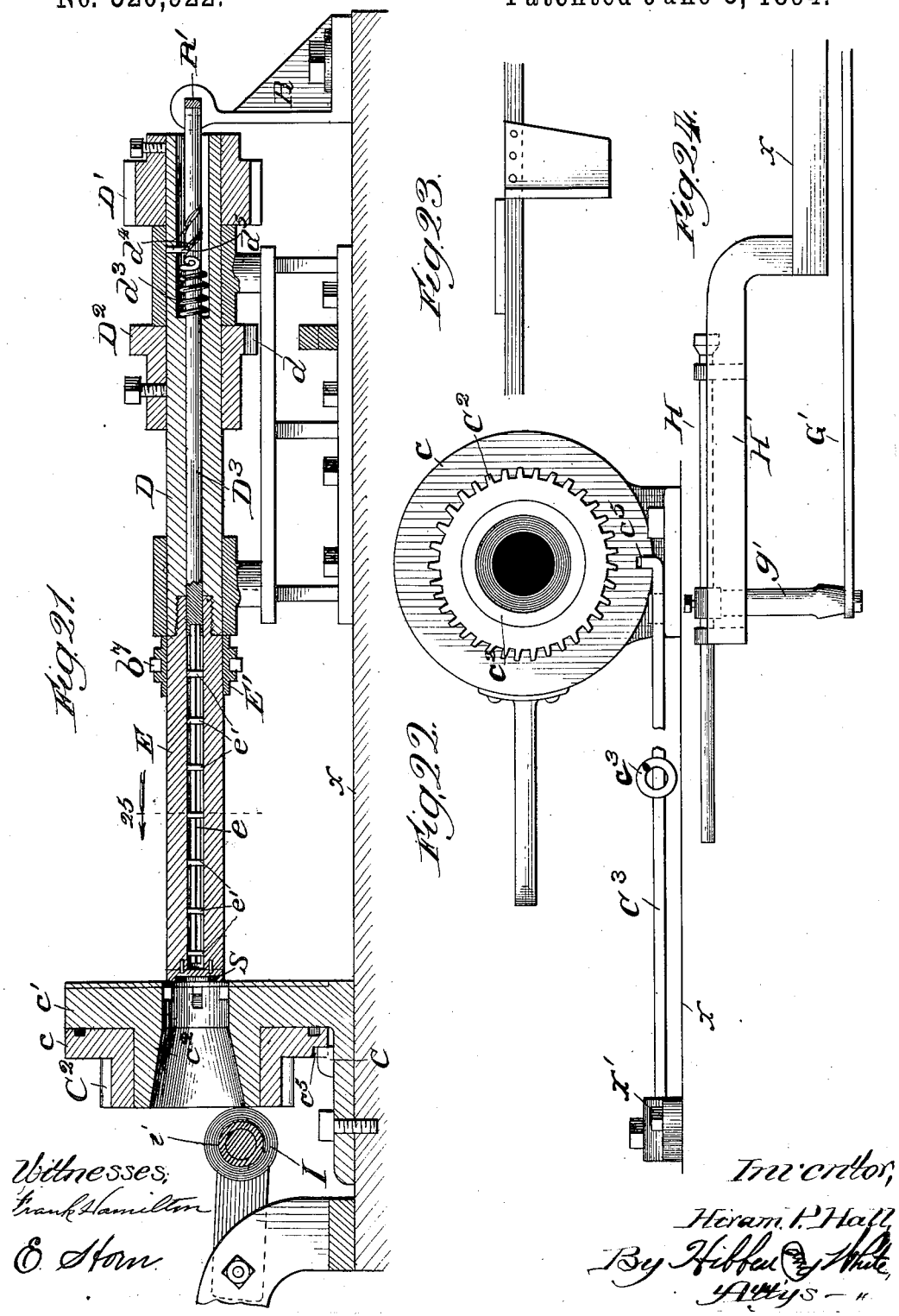
Witnesses:
Frank Hamilton
E. Storr
Inventor,
Hiram P. Hall
By Hibben & White
Attys

UNITED STATES PATENT OFFICE.

HIRAM P. HALL, OF CHICAGO, ILLINOIS.

APPARATUS FOR AUTOMATICALLY MANUFACTURING SHELLS FOR DYNAMITE.

SPECIFICATION forming part of Letters Patent No. 520,922, dated June 5, 1894.

Application filed June 24, 1892. Serial No. 437,907. (No model.)

*To all whom it may concern:*

Be it known that I, HIRAM P. HALL, a citizen of the United States, residing at Chicago, Cook county, Illinois, have invented a certain new and useful Apparatus for Automatically Manufacturing Shells for Dynamite, &c., of which the following is a specification.

My invention relates to a new mode of automatically manufacturing shells to contain dynamite, powder, &c., by the practice of which uniformly perfect shells may be obtained.

My invention also has for its object the construction of a machine for the manufacture of these shells, which machine will efficiently and automatically perform all the operations, and at the same time produce better results than have previously been attained by manual labor alone.

Heretofore shells have been manufactured almost entirely by hand, which is an operation expensive, laborious and slow, and without uniformity in the product. In the manufacture of shells as is now usually practiced, the paper is rolled into a tube, the lapping edges thereof pasted, and the end folded in entirely by hand. Sometimes, however, the rolling of the paper and the pasting of the edges is done by machinery, the resulting product being a long roll of paper which is cut into proper lengths, the end of which is folded in by hand as before. No practical means, however, have heretofore been devised whereby the paper which is cut into the proper size and shape is rolled, pasted, and one of its ends folded in to form a bottom in continuous and consecutive automatic movements of machinery. It is very obvious then that the previous, as well as the existing methods of making paper shells, not embodying my invention, are open to many serious objections in addition to those already referred to, chief among which may be named the limited production, and the lack of uniformity and perfection in the product.

To overcome the aforementioned difficulties and objections by the employment of a new method of operation, and to embody advantages and successful results not heretofore attained in the art of making shells is the object of the present invention.

My invention also relates to various other novel features of construction, and combination of parts, and consists in the features and details of construction hereinafter described and claimed.

Figure 26:
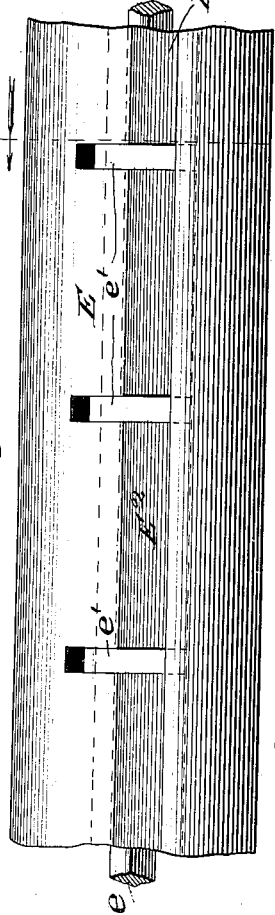
Figure 3:
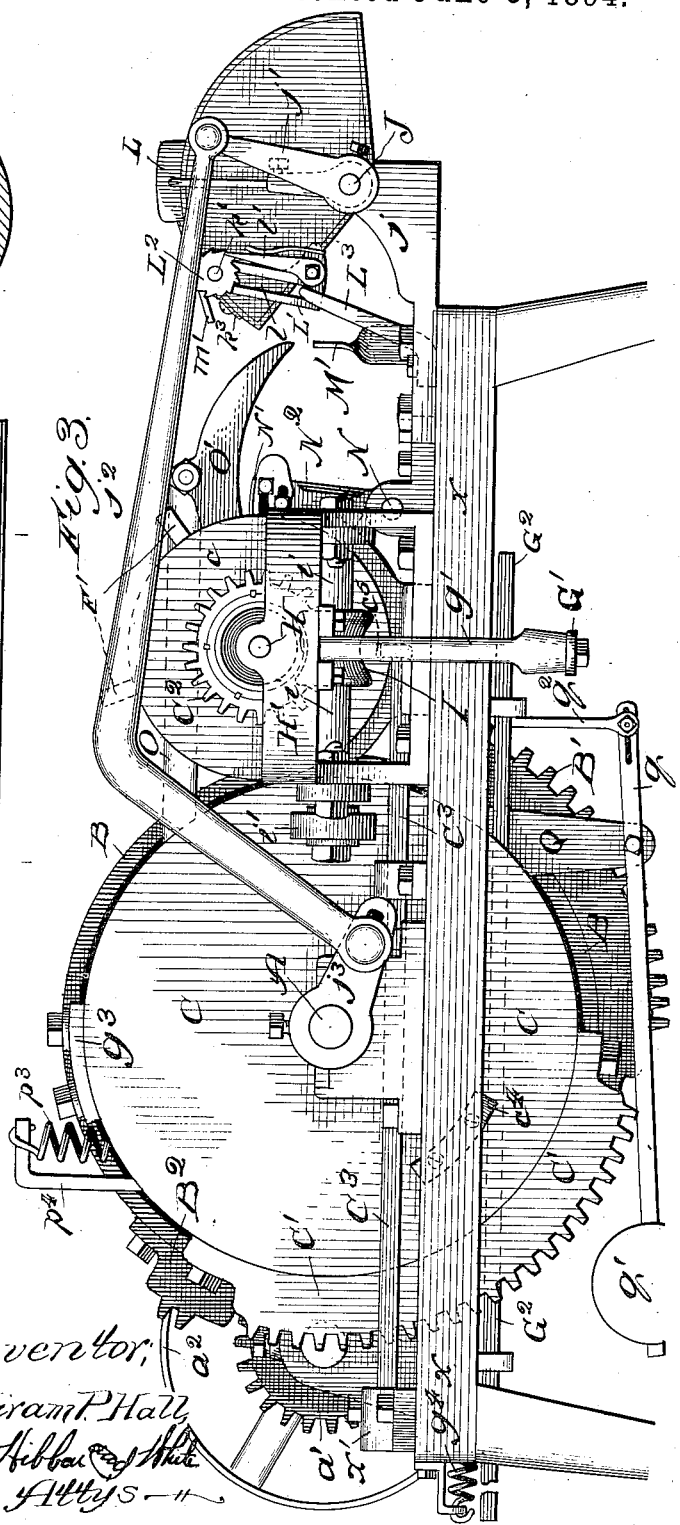

In the accompanying drawings, Figure 1 is a plan view of my machine; Fig. 2 a view looking at the right hand end of the same; Fig. 3 a similar view looking at the left-hand end; Fig. 4 a cross section on line 4 of Fig. 1, viewed in the direction indicated by the arrow; Fig. 5 a view on the same line looking in the opposite direction, as indicated by the arrow (5). Fig. 6 is a detail view showing the relative position of the paste-box and carrier, said carrier about to take a fresh piece of paper from the paste-box and convey it to the mandrel. In this position, the preceding piece of paper on the mandrel is approximately in the position shown in the drawings. Fig. 7 a detail view, showing the cams on the main shaft which operate the sealing jaws, the lower one of said jaws being shown in contact with the lower side of the mandrel, as it is immediately after the forward end of the paper on the mandrel has passed the center line; Fig. 8 a front view of the carrier; Fig. 9 a plan view of the same; Fig. 10 a detail view showing the side of the paste-box on which the mechanism for turning the paste-roller is attached, full lines representing said mechanism in its position when the paste-box is up, dotted lines showing it in the position when the paste-box is down, and indicating manner in which it turns the paste-roller; Fig. 11 a detail view of the bell crank and attachments, full lines illustrating one extreme position, and dotted lines the other, and showing the manner in which the heading plunger is drawn in toward the mandrel to compress the bottom of the shell; Fig. 12 a detail plan view of the wedge which operates the mandrel jaws; Fig. 13 a detail, sectional view on line 13 of Fig. 1, showing locking device on the mandrel shaft and dotted position of the cam which operates it; Fig. 14 a detail rear elevation of the folding mechanism, showing the position of the camway when all of the fingers are withdrawn from the center; Fig. 15 a similar view, showing the camway when one of the fingers has been advanced toward the center in their operation of folding the end of the shell; Fig. 16 a similar view showing the position of the camway when the next succeeding finger has been advanced toward the center to meet the preceding finger, so as to clamp the paper in the act of folding, while the said preceding finger is being withdrawn entirely from the center; Fig. 17 a sectional view on line 17 of Fig. 16, viewed in the direction of the arrow, showing the camway in the rotating disk and the slots in the stationary disk in which the pins on the folding fingers are free to move in their advancing and retreating motion of folding the end of the shell, the position of the shell being shown in dotted lines; Fig. 18 a detail view on line 18 of Fig. 1, showing the locking device on the bevel pinion which operates the pitman and the sleeve for removing the completed shell from the mandrel; Fig. 19 a detail view on line 19 of Fig. 5, showing the pitman connection between the sleeve which slides on the mandrel and the bevel pinion; Fig. 20 a detail, sectional view on line 20 of Fig. 1, showing the heading plunger with its connections to the bell-crank and the yielding lever for cushioning the recoil of said plunger; Fig. 21 a longitudinal, sectional view on line 21 of Fig. 1, viewed in the direction indicated by the arrow, showing the mechanism for opening the mandrel jaws or clamps; Fig. 22 a detail view on line 22 of Fig. 1, viewed as indicated by the arrow and showing the dog for locking the folding device to prevent it from turning only at predetermined periods; Fig. 23 a detail view on line 23 of Fig. 1, showing the shoulder or lug on the sliding bar, against which the lug on the disk contacts to operate the bell-crank; Fig. 24 a detail view on line 24 of Fig. 1, showing connection between plunger and rod which connects with bell-crank; Fig. 25 a sectional view of the mandrel on line 25 of Fig. 21; Fig. 26 a side elevation of a portion of the mandrel, showing longitudinal slot therein and jaws; Fig. 27 a perspective view of one of the jaws detached, showing the tooth which grips the paper; Fig. 28 a perspective view of a completed shell showing the folded end; and Fig. 29 an enlarged view showing a modified form of construction of rocking fingers for the paste box.

In constructing my machine, I first make a bed or table $x$ of any suitable material, preferably metal, and of proper dimensions to accommodate and support the various attachments and parts which constitute such machine. Supported upon the table, and mounted in suitable bearings secured to such table, is the main shaft A, which is connected by means of the train of gears $a$, $a'$ to the tight and loose pulleys $a^2$, which are properly journaled. The main shaft A carries two disks B and C, having inwardly extending peripheral flanges, which disks are located on the said shaft, preferably as shown in the drawings. Upon the periphery of the disk B I secure in any convenient manner the peripheral, segmental gear $B'$, which consists of a predetermined number of teeth. At a proper point distant from this gear, I secure another peripheral, segmental gear $B^2$, which also consists of a predetermined number of teeth. Upon the inner side of the inwardly extending flanges of the disk B is located the segmental bevel gear $B^3$, which consists likewise of a particular number of teeth, for a purpose hereinafter specified.

Upon the bed or table $x$, as shown in the drawings, is mounted the mandrel shaft D, which is journaled in proper bearings. This shaft is hollow and carries at one end a pinion $D'$, which meshes with the two segmental gears $B'$ and $B^2$, arranged upon the periphery of the disk B. The other end of this shaft D is adapted to receive a mandrel or former E, which rotates with the shaft and whose object is to form the body of the shell, as will be hereinafter more particularly described. Upon this shaft D I secure a flanged sleeve $D^2$, which is provided with two notches $d$ and $d'$, located at predetermined points to receive the spring dog $d^2$. The construction and operation of this dog will be apparent from an inspection of the drawings (see Figs. 5 and 13). It is held into engagement by means of a suitable spring, and, at a predetermined moment, that is, when it is desired that the mandrel shaft D should rotate (either one of the peripheral, segmental gears being about to mesh with the pinion $D'$) the dog is released from engagement with the sleeve against the tension of the spring, by means of the two cams $b$ and $b'$ secured to the flange of the disk B. These cams are located at predetermined points to release the dog at the proper time, so that the mandrel shaft shall be free to rotate through such engagement of the segmental gears on the disk B with the pinion $D'$.

The disk C, upon the main shaft A, is somewhat similar in construction to the disk B. Upon the periphery of the disk C is secured the segmental gear $C'$, which consists of a certain number of teeth, adapted to mesh with the pinion $C^2$. This pinion is keyed to or made a part of a movable disk $c$, which rotates upon its shoulder or bearing $c^2$ of another disk $c'$, which is stationary and firmly secured in any suitable manner to the table. This movable disk has a hollow center, and is provided with a camway F, of the particular form shown in Figs. 14, 15 and 16 of the drawings. The stationary disk $c'$ is provided with grooves or channels radiating toward its hollow center. These grooves are to accommodate the fingers $F'$, which are provided with pins $f$, adapted to travel in the camway F, and thus through the rotation of the movable disk $c$ to advance and withdraw the fingers to and from the center of the folder in their successive order. These fingers are constructed preferably of metal and in the form shown in the drawings, wherein it is observed that the lower corners are rounded off, in order to prevent tearing of the paper. They may be of any suitable dimensions, and of any particular number.

Referring now to the drawings, it will be observed that the contour of the camway is not perfect, but is broken at determined intervals to regulate the proper advancement and withdrawal of each finger. By this particular construction of camway, each finger will be advanced toward the center in two intermittent movements, but be withdrawn therefrom at a single movement. In this way the second finger proceeds to fold its proportionate part of the end of the shell before the first finger has been withdrawn, so that the first fold is held from unfolding until the succeeding fold is fairly made, when the first finger will retreat from the center. The operation of the succeeding fingers is the same, of course, as the first and second. When each finger is thus at rest for a moment, the pin on the finger is at that point in the cam which is on the circumference of a circle, whose center is the center point of the movable disk. When the finger is at rest, the previous finger has an opportunity to retreat; otherwise, the fingers would strike each other.

In the disk $c'$, slots $f'$ are provided for the pins $f$, which operate in the camway to allow freedom of movement as they perform their functions. One of the fingers which is the last to operate is provided with a spring $f^2$, which serves to withdraw it instantly from the center of the folding device for a purpose to be hereinafter more fully explained. The camway is of the peculiar form shown in the drawings, in order that the fingers may consecutively advance toward and be withdrawn from the center. The offset $f^3$ in the camway permits the passage of the pin in the rapid withdrawal of the last finger through the medium of the spring $f^2$, secured to such finger as heretofore described. Other means, however, may be employed to effect this rapid return; as for instance, the camway itself might be so constructed as to withdraw it by its operation on the pin on the finger.

Pivoted upon the table in any convenient manner as at $x'$ is the lock arm $C^3$, which normally engages in a notch $c^5$ located in the movable disk $c$ through means of the spring $c^3$, as shown in the drawings. When the segmental gear upon the periphery of the disk C is about to mesh or engage with the pinion $C^2$, and thus rotate it together with the movable disk $c$, the lock arm is released from its engagement through the instrumentality of the cam $c^4$ secured to the outer surface of the disk C at a predetermined point thereon. This cam contacts with the lock, forces it out of its engagement with the notch $c^5$ in the movable disk $c$ against the tension of the spring $c^3$.

Arranged preferably beneath the table is a bell crank G, pivoted at $g$, to one end of which bell crank is attached a rod $G'$. This rod is also connected to a downwardly projecting arm $g'$, which is firmly secured to the heading plunger or more technically speaking a reciprocating piston H. This plunger is mounted in any suitable framework attached to the end of the table, and is reciprocated back and forth therein as hereinafter described, to complete the operation of folding the bottom of the shell. The other end of said bell crank is attached in any suitable manner to a bar $G^2$, sliding in any suitable bearings, the said bar being provided with a projecting lug $g^2$, which is adapted to engage with a projecting lug or finger $g^3$, suitably secured to the disk C at a predetermined point. To one of the arms of the bell-crank is connected the spring $g^4$ in any convenient manner, whose object is to insure the rapid return of the plunger H to its original position. In order to ease and cushion the return of the plunger, I provide an arm $h$, which is preferably pivoted upon one of the guiding bars of the frame H', and at one side of the downwardly projecting arm $g'$. The outer end of the pivoted or yielding lever is forced toward and contacts with this arm $g'$, by means of any spring $h'$, of suitable tension (see Figs. 1 and 20). When in the rotation of the disk C the lug $g^3$, located on such disk, contacts with the projecting arm $g^2$ upon the sliding bar, it moves such bar in a horizontal direction toward the left (see Fig. 4). This movement operates the bell crank lever against the tension of the spring $g^4$, and causes the heading plunger H to advance inwardly toward the end of the mandrel E and to thereby contact with the bottom of the shell. The two extreme positions of the various parts above described are shown in detail in Fig. 11. Then as soon as the disk C has rotated far enough to release the lug $g^3$ from contact with the projecting arm, the sliding bar $G^2$ is rapidly withdrawn and returned to its original position by means of the spring $g^4$. In the same operation, the heading plunger H will be rapidly withdrawn and forced backward in the frame H', where it will contact with the pivoted arm or yielding lever $h$, which acts as a cushion, whereby the rapid return will be eased to prevent the breakage of any parts of the machine.

The end of the heading plunger is preferably provided with a removable head $h^2$, which can be made in various sizes to correspond with the size of the recess in the end of the mandrel, as hereinafter described. The size of the recess, of course, varies with the diameter of the mandrel used.

A spool I, mounted on a cross shaft $i$ which is arranged in suitable bearings, is located slightly below the center line of the mandrel shaft D, and is actuated by any suitable means, preferably by the friction wheel $i'$, which rotates by contact with the disk C. The purpose of this spool is to facilitate the removal of the completed shells beyond the line of the table after they have been thrust off the mandrel in a manner hereinafter described.

Upon the table $x$, I secure brackets $j, j'$, supporting the shaft J, connected to a paste-box K, which contains the paste to be supplied to one edge of the shell. This paste-box consists essentially of a vessel of any suitable form and dimensions, although I prefer to make it of the segmental form and of the relative dimensions shown in the drawings. It can be made of any suitable material, the object being simply to provide a vessel which will be adapted to hold the paste, and which will afford means of attachment for the various parts necessary for its automatic operation. At one end of the shaft J carrying the paste-box, I secure in any convenient manner the crank arm $j'$, which is connected by the pitman $j^2$ to the crank arm $j^3$ on the main shaft A. The crank $j^3$, which is preferably slotted to admit of adjustment, is shorter than the crank $j'$, and consequently the rotation of the main shaft communicates a rocking motion to the paste-box K. It will be understood, of course, that communication may be had to the interior of the box in any suitable way to supply the paste thereto; as for instance, through any kind of closable opening (not shown). The paste box is completely closed, except for a longitudinal slot in its upper side or circumference. This longitudinal slot $k$ extends preferably throughout its entire length, and is closed by means of a paste roller $k'$, resting in suitable bearings at the ends of the paste-box. This roller, thus communicating with the interior of the paste-box, is arranged to project slightly beyond its periphery or circumference, and is provided with the peripheral grooves $k^2$. Projecting over the roller are plates $k^3$, which are preferably separate and secured to the paste-box, as shown in the drawings. These plates act as stops for the paper or other material of which the shell is to be made, and serve to hold the paper upon the surface of the roller, so that the paste may be communicated thereto. Between the plates are spaces or interstices $k^4$, which correspond with the peripheral grooves $k^2$ in the paste roller $k'$. Although I have shown these interstices and three grooves, I do not wish to be understood as limiting myself to that particular number. Upon the top of the box, preferably in the position shown in the drawings, I locate an adjustable plate or guide L, secured in any suitable manner, whose object is to determine the position of the sheet of paper upon the box, so that each sheet will occupy the same position upon the mandrel. In order that the end of the shell may be perfectly folded, a certain proportion only of the body of such shell should be folded. When a large shell is to be made, the guide is moved a proper distance to the left (see Fig. 1), so that when the paper reaches the mandrel, such a length will project beyond the end of the mandrel as will be just sufficient for the bottom. When, however, a smaller shell is to be made, the guide is moved a proper distance to the right, so that on the smaller mandrel used, a less amount of the body of the shell will extend beyond the end of the mandrel, because for a smaller shell less material is needed for the bottom.

The object of the paste roller is to supply paste to that edge of the sheet of paper which is fed upon the periphery of the roller. It is obvious then that some means are required to rotate the roller to keep a sufficient quantity or fresh supply of paste upon the top of the roller. To accomplish this result, I secure at one end of the paste roller, which projects beyond the sides of the paste-box, a ratchet wheel $L^2$. To this roller is hung a swinging frame $L'$, provided with a slot $l$, and carrying the pawl $l'$, working upon the teeth of the ratchet wheel, and operated by a suitable spring. Firmly secured upon the table, by bolts or otherwise, is a stationary bracket arm $L^3$ preferably of the form and in the position indicated in the drawings (see Fig. 10). The end of this bracket arm is turned at right angles to fit into the slot $l$ of the swinging frame. In this manner, the rocking of the paste-box causes the swinging frame to rock back and forth upon the stationary bracket arm $L^3$, thereby communicating an intermittent rotary motion to the feed roller $k'$, thus exposing a supply of paste outside of the paste-box. It is apparent from an inspection of the drawings that when the paste box is rocked down, that is toward the left, as indicated in dotted lines (see Fig. 10) the swinging frame sliding upon the stationary bracket arm will be forced to swing upward, and the pawl engaging with the ratchet wheel will rotate said wheel, and with it the feed roller, toward the left. The returning of the paste-box to its original position, as indicated in full lines (Fig. 10) will cause the pawl to slip over several of the ratchet teeth and secure a new engagement upon the ratchet wheel, after which the same movements will be repeated at the proper time.

Extending from side to side upon the top surface of the paste-box, I arrange a thin plate M, preferably of metal, and provided with fingers. This plate is secured to a rod $m$, adapted to bear or rock in the ears or extensions secured to the ends of the paste-box. At one end of this rod $m$ I attach, in any suitable manner and at the proper angle, an arm $m'$, of a proper length. As is preferred and also most convenient in the arrangement of the various plates, I have shown this arm as attached to the end of the rod $m$ at the right hand side of the paste-box (Fig. 1). Upon the table I firmly secure, by bolts or in any other convenient manner, a bracket $M'$, of a proper height. Now, it will be observed that as the paste-box is rocked downward, the arm $m'$ will contact with the bracket $M'$, and thus rock the rod $m$, and thereby elevate or swing the plate M above the surface of the paste-box in order to raise the paper, as shown in dotted lines (Fig. 6). The object of the operation is to raise the paper so as to be caught under the fingers, and to be guided thereby on its passage to the mandrel jaws, as hereinafter described. When a small shell is to be made, a smaller sheet of paper, of course, is used than for a larger shell. Consequently, to extend beneath one edge of the paper, the rocking fingers must be advanced toward the paste roller to accommodate the smaller size of sheet, and be moved back away from the roller when a larger sheet is used. In Fig. 29, I have shown one method of adjustment of the plate or rocking fingers, wherein this plate is secured upon the upper face of a rod or plate, S, having its ends turned to form bearings, s. The plate, M, is provided with slots, T, whereby it may be moved back and forth, and secured in the desired position by means of the bolts, t, screwing into the plate, S.

The various parts just described in connection with the operation of the paste-box are so constructed and arranged, and capable of adjustment, that they will each perform their respective functions at the proper moment, and in the proper manner.

Suitable boxes or bearings are arranged on and secured to the table to receive a rock shaft N, which projects at one end beyond the table, which end carries a crank arm $n'$, connected by a pitman $n$ to the crank arm $n^2$ on the main shaft A. The crank $n^2$ is preferably slotted for adjustment. As the main shaft rotates the crank arm $n'$ being longer than the crank arm $n^2$ the shaft will communicate a rocking motion to the shaft N. Preferably near the left hand end of this rock shaft (see Fig. 1), I secure in any suitable manner the carrier device, which is clearly shown in Figs. 6, 8 and 9. It consists essentially of a framework composed of arms $N^2$, secured to the rock shaft, and carrying at their outer ends a curved plate $N'$, preferably with inwardly projecting flanges, and made of any suitable material. These flanges are preferably provided with slots, to afford means of adjustment for the plate $N'$. Upon this curved plate, as shown more particularly in Fig. 6 of the drawings, I secure hooks $n^3$ to take off the paper from the paste-box and hold it while it is being conveyed to the mandrel. Inasmuch as I have shown three grooves in the paste roller, so I have provided the plate $N'$ with three hooks to correspond, the number of such hooks, &c., however, being optional. It is to be observed that in order to properly perform its functions, the carrier must always travel in advance of the paste-box. This result I have accomplished by adjusting the crank arm $n^2$ on one end of the main shaft A, slightly in advance of the crank arm $n'$ at the other end, so that the shaft N and the carrier device thereon will rock in advance of the paste box.

Pivoted in any convenient way on the table, and at any suitable point back of the main shaft A is an arm O, projecting over the carrier device and supporting fingers $O'$. These fingers are made of any suitable shape that will guide the paper while being conveyed by the carrier to the mandrel jaws. The preferable construction of the fingers is shown in the drawings. Instead of using a broad, flat surface, I prefer to use flat strips, of metal or any other suitable material, so placed that their edges only will be exposed to the pasted edge of the paper. This construction is not liable to become smeared with the paste, and consequently does not retard the passage of the paper, as would be the case with a flat surface on which the paste might rapidly accumulate. To the arm O, at a point situated immediately in a line above the main shaft, I secure a downwardly projecting leg $o'$, whose foot impinges upon a cam $o$, arranged on said shaft. As the shaft rotates, the arm O and the fingers $O'$, carried thereon, will be elevated and lowered by the action of the cam upon the foot of the projecting leg, for an object to be hereinafter explained.

As has been before described, the disk B is provided with an internal, segmental gear $B^3$, consisting of a pre-appointed number of teeth. This segmental gear, which is beveled, meshes or engages with a bevel gear $B^4$, journaled upon the table, and connected to the train of gears $B^5$ and $B^6$, which actuate the shaft $b^2$. At the free end of this shaft is secured in any suitable way a crank arm $b^3$, which is connected to a pitman $b^4$. The other end of this pitman is connected to a sleeve $b^5$, fitting over and traveling upon a guide $b^6$, which is firmly secured to the table. This sleeve $b^5$ is provided with the forked extension $b^7$, which is received by a groove in another sleeve $E'$, which is adapted to travel along the mandrel. This latter sleeve $E'$ is mounted loose on the mandrel, but is prevented from moving lengthwise thereon until forced to do so by means of the movement of the pitman operated by the bevel gear. Inasmuch as the gear $B^3$ is segmental, the action of the pitman is intermittent, and the movement of the sleeve on the mandrel takes place at the required intervals to expel the completed shell from the mandrel as hereinafter described. Upon the edge of the flange of the disk B is attached a cam $b^8$, which is adapted to strike against the arm of a spring $B^7$, which engages with a notch $b^9$ in the collar of the bevel pinion $B^4$, and prevents the rotation of the same when so engaged. The spring dog $B^7$ is secured to the table in any convenient manner, and is preferably of the construction shown, particularly in Figs. 1 and 18. The dog is normally held into engagement with the notch in the collar by means of a spring; but is released therefrom against the tension of such spring by means of the impinging of the cam $b^8$ upon the end of the arm of the dog. This cam is so located that it will release the dog from engagement at the proper moment, thus permitting the shaft $b^2$ to be free to rotate as soon as the bevel gears mesh with each other.

Upon the table, preferably in the position shown in the drawings, (see Figs. 4 and 7) I firmly secure two standards or supports P, P, in which are fulcrumed two sealing jaws P' and P². The upper jaw is preferably of the form shown in the drawings. Its end $p$ is adapted to be advanced toward the mandrel and to press thereon, and then to be raised therefrom at the proper time. The other end of the upper jaw is provided with a yoke $p^2$, between whose arms runs the main shaft. This yoke, as shown in the drawings, is made separate from the other parts of the jaw, and attached thereto by means of bolts or otherwise, although it is obvious that it may be made integral therewith. Upon the rear end of this yoke, the end of a spring $p^3$ is attached (see Fig. 4). The other end of this spring is preferably fastened to the bent arm of a standard $p^4$, supported upon the table. The tendency of the spring is to raise the yoke, and thus to lower the other end $p$ of the jaw upon the surface of the mandrel. In order to operate the upper sealing jaw, the shaft A carries a cam $p^5$, secured thereto in any convenient way, which is adapted to impinge upon the yoke and to lower the rear end of the jaw against the tension of the spring $p^4$, and thus to elevate and withdraw the other end $p$ of the jaw from the mandrel. The lower jaw P² is fulcrumed in the same manner as the upper jaw to the standards P, P. At a proper point beneath the table is a hanger Q (Fig. 4), upon whose lower end is fulcrumed a lever $q$, and carrying at one end a suitable weight $q'$. At the other end of this lever is connected, in any convenient manner, a rod $q^2$, passing through a suitable opening in the table and pressing against the lower side of a cross piece of the framework of the lower jaw. The tendency of this weight, or any substitute thereof, is to force the lower jaw P² against the surface of the mandrel. In order to withdraw this jaw from the mandrel at the proper time, I provide a cam $q^3$ upon the main shaft, similar to the cam $p^5$, which operates the upper jaw. This cam $q^3$ forces the rear end $q^4$ of the jaw upward, thereby lowering the end $p'$ and withdrawing it from the mandrel. The cam $q^3$ is somewhat shorter than the cam $p^5$ which operates the upper jaw, and by this means admits of the lower jaw P² coming in contact with the mandrel before the upper jaw P' is operated, and immediately after the clamps or jaws of the mandrel holding the paper have passed the center line, in order that the paper may be taut and smooth upon the mandrel. The ends of each of the jaws are preferably made hollow to admit of the circulation of steam or hot air, conveyed thereto by means of suitable piping. Other means, however, may be employed for heating, as desired. The object of thus heating the jaws is to facilitate the drying of the paste upon the edge of the shell, and to iron the paper.

The construction of my mandrel, on which the body of the shell is formed, is shown particularly in Figs. 21, 25 and 26, and consists of a hollow shaft provided with a longitudinal slot E². This mandrel may be made of any suitable dimensions. If it is desired to make a shell of large diameter a large mandrel is employed; but if a shell of smaller diameter is desired, a mandrel correspondingly smaller in diameter is necessary. The diameter of the mandrel determines the diameter of the shell formed thereon. Whether the mandrel is of large or small diameter, one of its ends is so constructed that it may be firmly secured in any suitable manner, as for instance, by threading, bolting or otherwise, to one end of the hollow shaft D. (Fig. 21.) A rod D³ passes through the mandrel shaft D, and is provided at its end adjacent to the mandrel with a socket, preferably square, and receiving the end of a rod $e$, which passes through the mandrel, and which is preferably square to correspond with the socket. Along this rod $e$ are arranged, at intervals, any suitable number of jaws or clamps $e'$. These jaws are preferably of the form illustrated in the drawings, (see Fig. 27,) wherein the jaw is provided with a tooth $e^2$, which is adapted to enter a corresponding recess in one side of the longitudinal slot E². This tooth normally fits into this recess. Upon the rod D³ is attached a spring $d^3$, abutting at one end against a shoulder in the shaft D, and at the other end against a pin upon such rod. At any suitable place on this rod I provide a spiral groove $d^4$, and preferably on the inner wall of the mandrel shaft, I arrange a projecting pin $d^5$, adapted to fit into the spiral groove. Mounted in suitable guides, as R, upon the table is a rod R', one of whose surfaces is inclined to form a wedge as shown in Fig. 12. The whole rod, however, I have termed a wedge. This wedge has one of its ends turned at right angles, which terminates in a foot $r$. Upon the disk B I secure two cams $r'$ and $r^2$, whose object is to operate the wedge R'. It is to be observed that the positions of the cams relative to the disk which carries them is different for this reason. The object of the cam $r'$ is to force the wedge to the left (see Fig. 2) and away from the disk, while the purpose of the other cam $r^2$ is to draw the wedge inward toward the right. The action of the one is the reverse of the other.

The rod D³ in the hollow mandrel shaft is adapted to project outward therefrom, so that its end impinges upon the inclined surface of the wedge. When the cam $r'$ contacts with the end of the wedge, forcing it to the left, (see Fig. 2) it will be seen that the motion of the wedge will be communicated to the rod D³ at right angles, and thereby said rod will be forced inward. Inasmuch as the stationary pin $d^5$ rests in the groove $d^4$, the rod must necessarily rotate as it is forced inward against the tension of the spring $d^3$. In this manner the rod $e$ is rocked, and the jaws $e'$, carried thereon, are likewise rocked. The tendency of the spring $d^3$ is to hold the jaws $e'$, and the teeth thereon, in the recess at one side of the slot in the mandrel. The jaws are then said to be closed, but when the rod $D^3$ is rocked, the rod $e$, which carries the jaws and is received in the socket in the end of the rod, is also rocked, thereby removing the teeth out of the recess, and thus opening the jaw to receive the edge of the paper. When in the further rotation of the disk, B, the other cam, $r^2$, has engaged with the end $r$, the wedge will be withdrawn, and the rod, $D^3$, will of course return to its original position, through the instrumentality of the spring, $d^3$. The cams are so located on the disk that they will operate to open and close the mandrel jaws at the proper time. I do not, however, wish to limit myself to having the spiral groove in the rod, $D^3$, and the pin, $d^5$ in the shaft, as it is obvious that the desired rocking motion may be secured by cutting the spiral slot in the wall of the shaft, D, and having the pin, $d^5$, fixed to the rod, $D^3$, and entering the spiral slot.

The free end of the mandrel is preferably provided with a recess, S, preferably circular, into which the head of the plunger enters to effectually crease the folds in the bottom of the shell, in order to prevent the unfolding thereof. The head, $h^2$, on the end of the plunger is preferably removable, and the proper size can be attached thereto to correspond with the recess in the mandrel; these mandrels being made of various sizes to form shells of various diameters. It is obvious, however, that the folds may be creased by simple contact of the piston against a mandrel having its end made plain, and that other means besides the recess for forming a suitable crease may be used upon either the end of the mandrel or the head of the piston, although I prefer to use the recess as described.

Although in some instances, I have specified the character of the material of which the various parts are constructed, I do not wish to limit myself to any particular material herein so specified; and although I prefer to construct my machine entirely of metal, any other material might be substituted for various parts therein.

The various parts being constructed and arranged as hereinbefore described and explained, I will now proceed to describe the operation of my machine, and follow the various stages of the manufacture of the shell from its inception in the machine in its initial form, to its expulsion from the mandrel in its completed form.

As the first step in the operation the paper, which is cut into the proper size and shape, is placed flat upon the periphery of the paste-box, where its lower side or edge rests under the plates and upon the paste roller, whereby paste is communicated thereto. The adjustable guide on the box determines its position to the right or left hand of the box, and consequently determines its position on the mandrel. Power being now applied to the tight pulley is transmitted through the train of gears to the main shaft, which is thereby rotated. Through this rotation of the main shaft, the paste-box is caused to rock by means of its connection with said shaft, through the cranks and pitman before described. This rocking of the paste-box turns or rotates the paste roller in the paste-box, through the intervention of the swinging frame and the pawl and ratchet at one end of the box. In this manner the paper, being upon the upper side of the roller, receives paste along the edge on its lower side. But before, however, the paste-box has reached the limit of its downward movement, the rod $m'$ contacts or bears upon the upper face of the stationary bracket $M'$, thus raising or rocking the plate or fingers M, which have heretofore reclined close upon the surface of the vessel and beneath the sheet of paper. The position of these fingers at this stage of the operation is clearly illustrated in dotted lines in the drawings, (Fig. 6.) It is to be observed also by reference to this figure that the feeding mechanism, or carrier, is at its lowest position, and that the hooks project beyond and into the periphery of the paste-box. While the box is still in this position, and before it has commenced to return, the carrier begins to rise, being rocked by the rock shaft connected by means of the cranks and pitman to the main shaft A, as before explained. In thus rising the hooks $n^3$, moving closely to the paste-box, pass through the interstices $k^4$ of the plates $k^3$, and through the peripheral grooves $k^2$ in the roller $k'$. In this manner, by the further revolution or rocking of the carrier, the hooks pass underneath and behind the edge of the pasted end of the paper, removing it from the box, and transferring it to the carrier. At the same time, the upper edge of the paper, which, as before noticed, has been turned or raised by means of the automatic raised plate M, strikes against the curved or crescent-shaped fingers, which have just descended, to guide or direct the paper on its passage toward the mandrel. The sheet of paper has thereby been turned over, so that the pasted edge which was on the lower side is now on the upper side, and is the last edge to reach the mandrel. When the carrier has reached the mandrel, the edge of the paper thereon is forced or thrust into the jaws of the mandrel or former, which are opened by the contact of the cam $r'$ against the wedge $R'$, which bears against the rod $D^3$ in the hollow shaft in the manner before explained. The other cam $r^2$ also located on the disk B, which rotates in the direction indicated by the arrow, withdraws the wedge, allowing the jaws of the mandrel to close by the tension of the spring $d^3$ in the hollow shaft, thereby gripping the paper which was thrust by the carrier into the jaws when open. The various parts and devices of my machine now assume the position indicated by all the principal figures of the drawings. It is to be observed that the long segmental gear B' upon the periphery of the disk B is now about to engage with and rotate the pinion D', by which the mandrel is rotated. However, before the mandrel shaft D can be free to rotate, the spring dog $d^2$, which is in engagement with the lock $d^3$ on the flanged collar $D^2$ must first be released therefrom. This is accomplished by the action of the cam $b$, located upon the inner surface of the disk B, said cam being of a length sufficient to hold the dog out of engagement the proper length of time. The mandrel shaft is now at liberty to rotate and the segmental gear then engages with the pinion D', rotating it together with the mandrel or former. During this rotation the following movements and operations occur: About the time when the paper is seized by the jaws of the mandrel, the lower pivoted sealing jaw $P^2$, which normally presses against the surface of the mandrel, is forced downward therefrom against the action of the weight by the cam $q^3$ mounted on the main shaft. As soon as, in the rotation of the mandrel, the jaws holding the paper have passed the center line, the end $q^4$ of the jaw is released from the cam, and the action of the weight, being now exerted, presses the end $p'$ of the sealing jaw $P^2$ upon the mandrel and the paper being rolled thereon. The operation of the upper sealing jaw P' is similar to the lower. As soon as the jaws $e'$, in the mandrel, have rotated beyond the center above, the cam $p^5$ upon the main shaft raises the end $p^2$ of the sealing jaw $P^2$, and thus lowers the other end P. The rotation of the mandrel continuing, the edges of the paper overlap, thus forming the tube or body of the shell. The rotation, however, ceases when the segmental gear B' has passed from engagement with the pinion D' on the mandrel shaft, at which time its spring dog $d^2$ engages with the notch $d$ in the sleeve on the mandrel shaft. The seam of the tube is now about on the top of the mandrel and beneath the upper sealing jaw, which presses firmly upon said seam to prevent its opening, while the succeeding operation of folding the bottom is progressing. It is understood, of course, that steam or any other means of heating is being supplied to the jaws, whose object is to facilitate the drying of the paste at the seam, and to remove or prevent all creases in the paper, thus insuring a tube with a perfectly tight seam, and of the exact size of the mandrel. Next in the sequence of automatic operations the mechanism depending for its movements upon the other disk C begins to perform its functions. The dog $C^3$, which normally engages with the notch in the disk $c$ when such disk is in a state of rest, is released therefrom by the pressure of the cam $c^4$, located upon the outer surface of the disk C. The disk carrying or containing the camway F is now ready to rotate through the engagement of the peripheral segmental gear C' with the pinion $C^2$. By this means, the fingers contained in the stationary disk $c$ will be advanced toward and withdrawn from the center in their successive order by means of the pins $f$ traveling in the camway; it being borne in mind, as has been heretofore explained, that the material of the shell now in the form of a tube extends beyond the end of the mandrel, and into the open center of the folder a proper distance to supply sufficient material for the formation of the end of the shell. As soon as the first finger has reached the center and folded its proportionate part of the end, the second finger will begin to advance, but only advancing part way toward the center to meet the first finger, in order to prevent the folded portion of the end from unfolding. It will be seen that when the first finger has been withdrawn, the second finger will be allowed to farther advance toward the center. This successive operation is repeated by the other fingers, which I have shown as five in number, although I do not wish to be understood as limiting myself to that particular number, which I have simply taken as preferable. It is to be noticed in this connection that one of the fingers is provided with a spring $f^2$. The object of this spring is to withdraw the finger more rapidly than it otherwise would have been in the ordinary course, by means of the camway. The reason of the necessity of this instant withdrawal of the finger is to allow the action of the reciprocating plunger H, which acts next in the series of automatic movements. As before described in detail, this plunger or header is operated by the bell crank G, fulcrumed beneath the bed or table of the machine. The finger $g^3$ on the inner surface of the disk C engages with the projecting arm $g^2$, located on the bar $G^2$, and through the medium of the bell crank thrusts the plunger inward with considerable force against the folded end of the shell, which is thereby pressed into the recess in the end of the mandrel. In this way, the folds are creased to effectually prevent unfolding. The plunger, it is obvious, operates at the instant when the last finger is withdrawn in the folder, as above described. After the bar $G^2$ is released from contact with the lug or finger $g^3$ on the disk C, the spring $g^4$, secured to the bell crank, causes the rapid return of the plunger to its original position. After the body and the bottom of the shell have been thus formed, and while the upper jaw is still pressing upon it, the mandrel is given approximately a quarter turn, in order that the seam may be smoothed or ironed to insure a perfect sealing of the shell. This fractional rotation is produced by means of the short segmental gear $B^2$, the spring dog being released from engagement with the notch $d$ by the cam $b'$, preceding in action the segmental gear. After the fractional rotation the dog engages with the other notch $d'$ and prevents the shaft from rotating. The shell is now in a finished condition, and ready to be expelled from the mandrel. This is accomplished as follows: As soon as the plunger has performed its part, a cam $b^8$ on the inner surface of the disk B releases the dog $B^7$ from engagement in the notch in the collar of the bevel pinion. The shaft $b^2$ being now free, is rotated by the segmental bevel gear $B^3$, meshing with the bevel pinion $B^4$. The motion is communicated to the pitman through the crank arm. This pitman being connected to the forked arm $b^7$, as already described in detail, imparts a reciprocating motion to such arm, and consequently to the sleeve E', which must therefore travel on the mandrel. In this way, the sleeve thus sliding along the mandrel and toward its end, removes or rather expels the completed shell. This operation is facilitated by means of the spool-shaped carrier I, which is continually rotating on the short cross shaft operated by means of the friction pulley $i'$, contacting against the side of the disk C. The sleeve is then returned to its starting position by the further rotation of the shaft $b^2$. This action of the sleeve takes place automatically and intermittently at the proper determined intervals. This is the last movement to be observed in following the various stages of the manufacture of shells, as performed automatically by machinery embodying my invention. To obtain some conception of the rapidity of action of the various parts and quick succession thereof, I will here state that the time usually required for the formation of the shell through the various stages as I have already described them is less than two seconds when the machine is operating at a moderate speed, as I have determined in practice.

All the operations of the machine, as I have herein described them, are performed in one revolution of the main shaft A.

In the construction of my machine, as shown in the drawings, the long segmental gear B' on the disk B gives the pinion D', and consequently the mandrel E, a one and three quarters rotation, while the short segmental gear $B^2$ turns the same parts a fraction of one rotation, which amounts to approximately a quarter. The sum of these two movements amounts to about two complete rotations of the pinion D' and mandrel E. The number of teeth on the segmental gears, however, may be changed to vary the amount of rotation of the mandrel, the exact construction shown in the drawings being simply a preferable one, to which I do not wish to limit myself.

When the perfect shell has been expelled from the mandrel and the sleeve has been returned, another sheet of paper, which has previously been through the first operations described, is instantly gripped by the jaws of the mandrel, and the same operations as before will be repeated.

In Fig. 28 I have shown in perspective a completed shell, wherein is clearly represented the folds and the circular crease made by the compact of the plunger against the bottom.

It is to be observed that it is necessary to have the many parts and attachments so nicely arranged and timed that the various movements will occur at the proper time. After the laying of the sheet of paper upon the paste-box, all the movements and operations toward the formation of the shell are entirely automatic, and the finished product of the machine cannot be equalled in any respect by the result of manual labor. The amount of production is limited only by mechanical considerations.

Although I have described various forms and details of construction, I do not desire to be understood as limiting myself thereto, but desire to deviate therefrom as convenient, or as circumstances may suggest or render expedient. I have simply shown and described a preferable construction and arrangement of parts, but am well aware that changes may be made in the exact location and precise form of many of the parts, the proportions thereof altered and equivalents substituted therefor without departing from the spirit of my invention, which consists in the apparatus for automatically making shells for dynamite or other substances from a sheet of the proper material cut into the proper size.

What I regard as new, and desire to secure by Letters Patent, is—

1. In a machine for making shells, the combination of a mandrel adapted to form the body of a shell, and means for making consecutive folds in the bottom thereof, substantially as described.

2. In a machine for making shells, the device for making the bottom of the shells, which consists of a frame, fingers supported therein, and means for operating said fingers consecutively to fold the bottom of the shell, substantially as described.

3. In a shell making machine, the device for folding the bottom of the shell, which consists of a frame, fingers arranged therein and radiating from a common center, and means for advancing and withdrawing said fingers consecutively, substantially as described.

4. In a shell making machine, the device for folding the bottom of the shell, which consists of a stationary disk, radiating fingers operating therein, a rotatable cam way, and pins on said fingers adapted to enter the cam way, whereby as the cam way rotates the fingers will advance and retreat from the common center, substantially as described.

5. In a shell making machine, the device for folding the bottom of the shell, which consists of a stationary disk provided with a hollow center, radiating fingers operating in said disk, and means whereby the fingers may be consecutively advanced and withdrawn from the common center, substantially as described.

6. In a shell making machine, a device for folding the bottom of the shell, which consists of a disk provided with an opening at its center of greater diameter than that of the shell, fingers radiating from such center, and means whereby such fingers may be consecutively advanced and withdrawn to fold the end of the shell, substantially as described.

7. In a shell making machine, a device for folding the bottom of the shell, which consists of a disk having an opening at its center of greater diameter than that of the shell and having a cam way therein, a frame supporting radiating fingers, pins on said fingers adapted to travel in such cam-way, and means for rotating said disk, whereby the fingers will be caused to successively advance and retreat from the center of the shell, substantially as described.

8. In a shell making machine, the combination of a movable disk provided with a cam-way, a stationary disk supporting radiating fingers, said fingers being provided with pins adapted to enter said cam-way, whereby as the movable disk is rotated the fingers will advance and retreat in successive order to and from the center of the disk, substantially as described.

9. In a shell making machine, the combination of a mandrel to form the body of the shell, and a device for folding the end of the shell, which consists of a rotatable disk provided with a cam-way having predetermined portions thereof on a line of the circumference of a circle drawn from the center of said disk, and fingers suitably supported and actuated by the contour of the cam-way, whereby the fingers will be in a state of rest for predetermined intervals of time during the rotation of the disk, substantially as described.

10. In a shell making machine, the combination of a mandrel to form the body of the shell, a frame, movable fingers supported therein and adapted to advance and retreat successively, and a device for advancing and withdrawing the fingers to and from a common center, which consists of a rotatable disk provided with a cam-way having one portion thereof approximately on a line of a radius from the common center, and means for retracting one of the fingers, substantially as described.

11. The combination of a movable disk provided with a cam-way, fingers radiating from a common center and provided with pins entering said cam-way, means for supporting said fingers, and means whereby one of said fingers may be rapidly withdrawn from the center, substantially as described.

12. The combination of a movable disk provided with a cam-way, a stationary disk, fingers supported therein and radiating from a common center, pins secured to said fingers and adapted to enter said cam-way, and a spring secured to one of said fingers which is normally held away from the common center, but adapted to be advanced toward such center by the action of said cam-way against the tension of the spring, substantially as described.

13. In apparatus for the automatic manufacture of shells, the combination of a movable disk provided with a cam-way, a portion of which follows approximately a line of a radius from the center of said disks, a stationary disk, fingers supported therein and adapted to be advanced and withdrawn readily to and from a common center, pins secured to said fingers and adapted to enter said cam-way, a spring attached to one of said fingers, whereby when said portion of the cam-way which is approximately on a line of a radius from the center of the movable disk is parallel to the axis of the spring actuated finger, said finger will be withdrawn from the common center by the tension of the spring to its normal position, substantially as described.

14. In an apparatus for the automatic manufacture of shells, a carrier comprising a curved plate having flanged sides, arms secured thereto and mounted on a rock shaft, means for supporting the paper while on the plate, and means whereby said plate may be adjusted on said arms, substantially as described.

15. In apparatus for the automatic manufacture of shells, the combination of a rotatable mandrel, a sleeve loosely mounted on said mandrel, a rotatable disk provided with segmental gear to rotate said mandrel at intervals, internal segmental gear arranged on said disk, a pinion adapted to engage therewith and rotating a shaft, means whereby said shaft may be prevented from rotating at predetermined intervals, a pitman connection secured to said shaft and attached to said sleeve on the mandrel, whereby as the pitman is operated the sleeve will move longitudinally along said mandrel, substantially as described.

16. In apparatus for the automatic manufacture of shells, the combination of a rotatable mandrel, a sleeve loosely mounted thereon, a rotatable disk provided with segmental gear to rotate said mandrel at intervals, internal segmental gear arranged on said disk, a pinion adapted to engage therewith and rotating a shaft, a dog engaging with locks on said pinion, cams on said disk to release said dog, a crank secured to said shaft, a pitman thereon, a sleeve secured to said pitman and traveling in guides, a forked arm connected to said sleeve engaging with a groove on the sleeve mounted on the mandrel, substantially as described.

17. In apparatus for the automatic manufacture of shells, the combination of a mandrel mounted on a table, a pivoted sealing jaw adapted to press on said mandrel, a hanger secured to said table, a lever fulcrumed thereon and carrying a weight at one end, and a rod connected to the other end and passing through an opening in such table to press upward against the framework of the jaw, whereby the end of the jaw may press upon the surface of the mandrel, substantially as described.

18. In apparatus for the automatic manufacture of shells, the combination of a rotatable mandrel to form the body of the shell, and two sealing jaws to compress the paper on the mandrel, the ends of said jaws adjacent to the mandrel being hollow to admit of the passage of steam, &c., substantially as described.

19. In apparatus for the automatic manufacture of shells, the combination of a mandrel adapted to form the body of the shell and provided with a recess at one end, mechanism for folding the bottom of the shell, and a device for creasing the bottom, which comprises a reciprocating piston mounted in a framework, an arm attached thereto and connected with a rod, a bell crank carrying said rod on one arm, and means whereby such bell crank may be operated at desired intervals, substantially as described 20. In apparatus for the automatic manufacture of shells, the combination of a mandrel adapted to form the body of the shell and provided with a recess at one end, mechanism for folding the bottom thereof, and a device for creasing the bottom of the shell, which comprises a piston reciprocating in a suitable framework, an arm attached thereto and connected with a rod, a bell crank carrying said rod on one arm, a sliding bar connected to the other end of said bell crank, a projecting arm on said bar, a rotatable disk provided with a finger to engage with said projecting arm, whereby as the disk is rotated the piston will be forced forward against the end of the shell, substantially as described.

21. In apparatus for the automatic manufacture of shells, the combination of a paste-box provided with a roller communicating with the interior thereof and projecting beyond its surface, a ratchet wheel secured to the end of such roller, a slotted frame swinging on said roller and carrying a pawl engaging with said ratchet wheel, a stationary pin upon which the slotted frame slides, and means for rocking the paste-box, whereby the roller will be rotated, substantially as described.

22. In apparatus for the automatic manufacture of shells, the combination of a paste-box provided with a longitudinal slot, plates arranged near the edge of said slot and having interstices between them, a roller rotating in said slot and provided with peripheral grooves corresponding with said interstices, a carrier mounted on a rock shaft and provided with hooks for holding the edge of the paper, said hooks adapted to move along said grooves, and means for rocking said paste-box and carrier, whereby the carrier will remove the paper from the paste-box to itself, substantially as described.

23. In apparatus for the automatic manufacture of shells, the combination of a paste-box having stops on one of its surfaces, a paste roller adjacent to said stops, a plate pivoted on said box and adapted to raise one end of the paper placed on the box, and means for rocking said plate, substantially as described.

24. In apparatus for the automatic manufacture of shells, a paste-box having a roller communicating with the interior and exterior thereof, means for rocking said paste-box, means for holding the edge of the paper over the paste roller, means whereby such roller may be rotated when the box is rocked, a plate pivoted upon such box, a stationary independent bracket, and a rod connected to the plate, whereby as the box is rocked the rod will contact said bracket to raise the plate above the surface of the box, substantially as described.

25. In apparatus for the automatic manufacture of shells, a mandrel to form the body of the shell, a guide for the passage of the paper to the mandrel, which consists of a pivoted arm provided with curved fingers, means whereby such arm may be raised and lowered at predetermined intervals, and means for feeding the paper along the guide to the mandrel, substantially as described.

26. In apparatus for the automatic manufacture of shells, the combination of a mandrel, a pivoted arm provided at its free end with fingers, mechanism for feeding the paper along the fingers to the mandrel, a cam on said shaft, a lug secured to said arm and contacting such cam, whereby the fingers may be raised and lowered at predetermined intervals to guide the paper from the feeding mechanism and guide it to the mandrel, substantially as described.

27. In apparatus for the automatic manufacture of shells, the combination of a mandrel, a paste vessel adjacent thereto, a paste roll therein for pasting an edge of a sheet of paper placed thereon, means for rocking said vessel, and means for conveying the paper from said vessel to the mandrel, substantially as described.

28. In apparatus for the automatic manufacture of shells, the combination of a paste vessel, a paste roll therein for pasting an edge of a sheet of paper placed thereon, said vessel being mounted on a rock shaft, a carrier mounted on a rock shaft, mechanism for rocking the carrier in advance of the paste vessel, whereby as the carrier is rocked the paper will be transferred from said vessel to the carrier, substantially as described.

29. In apparatus for the automatic manufacture of shells, the combination of a paste vessel, a paste roll thereon adapted to paste an edge of a sheet of paper placed thereon, a rock shaft attached to said vessel, a crank and a pitman connected to the main shaft and to said rock shaft, a carrier mounted on a rock shaft, a crank, and a connector connecting it to said main shaft, the latter crank being shorter than the crank on the shaft of the paste-box, whereby as the main shaft is rotated the carrier will rock in advance of the paste vessel, substantially as described.

30. In apparatus for the manufacture of shells, the combination of a hollow mandrel provided with a longitudinal slot, a rod passing through such mandrel and provided with a spiral groove, jaws on said rod, a stationary pin adapted to fit in said groove, and means for moving the rod longitudinally, whereby the rod will be rotated, substantially as described.

31. In apparatus for the manufacture of shells, the combination of a hollow mandrel secured to a hollow rotatable shaft, a longitudinal slot in said mandrel, a rod passing through said mandrel and shaft and provided with a spiral groove near one end, jaws mounted thereon, a stationary pin secured to the inner wall of said shaft and adapted to fit in such groove, a spring secured to said rod to normally hold the jaws in contact with the sides of the slot, and means for moving said rod longitudinally, substantially as described.

32. In apparatus for the manufacture of shells, the combination of a hollow mandrel secured to a hollow rotatable shaft, a longitudinal slot in said mandrel, a rod passing through such shaft, a spiral groove thereon, a stationary pin secured to the inner wall of said shaft and fitting in such groove, said rod being provided with a socket at its end adjacent to the mandrel, a rod fitting in such socket and passing through the center of the mandrel, jaws mounted on the rod in said mandrel, and means for moving said rod longitudinally, substantially as described.

33. In apparatus for the manufacture of shells, the combination of a mandrel having a longitudinal slot and secured to a hollow shaft, a rod passing therethrough and provided with a spiral groove, jaws arranged on said rod, a stationary pin fitting in said groove, a wedge abutting against the end of said rod and adapted to slide back and forth, and means whereby such wedge may be advanced and withdrawn at predetermined intervals, substantially as described.

34. In apparatus for the manufacture of shells, the combination of a hollow mandrel secured to a hollow shaft and provided with a longitudinal slot, a rod passing through such mandrel and shaft, a spiral groove thereon, jaws arranged on said rod, a stationary pin secured to the inner wall of said shaft and fitting in said groove, means for normally holding said jaws closed, a wedge abutting against the end of the rod and adapted to slide back and forth, and cams engaging with said wedge to advance and withdraw it at predetermined intervals, whereby the jaws may be open and closed, substantially as described.

35. In apparatus for the automatic manufacture of shells, the combination of a hollow mandrel secured to a hollow rotatable shaft and provided with a longitudinal slot, a rod passing through such mandrel and shaft, a groove running spirally therein, jaws mounted on said rod, a stationary pin secured to the inner wall of said shaft and fitting in said groove, means for normally holding said jaws closed, and means whereby the rod may be forced inward to operate said slot at the required moment, substantially as described.

36. In apparatus for the manufacture of shells, the combination of a mandrel mounted upon a shaft and the device for opening and closing the jaws of the mandrel, which consist of a disk, cams on said disk, a rod passing through the mandrel and mandrel shaft and carrying the jaws, said rod being provided with a spiral groove, a stationary pin fitting into such groove, a spring on said rod normally holding the jaws closed, a sliding wedge contacting the end of said rod, and a shoulder on said wedge engaging with the cams, whereby the wedge may be reciprocated, substantially as described.

37. In a shell making machine, the combination of a mandrel adapted to form the body of the shell, folding mechanism adapted to fold the bottom of the shell by consecutive folds, and a reciprocating piston adapted to contact the end of the mandrel at predetermined intervals, whereby the folds of the bottom are creased to prevent unfolding, substantially as described.

38. In a shell making machine, the combination of a mandrel adapted to form the body of the shell and provided with a recess at one end thereof, mechanism for folding the bottom of the shell over the end of the mandrel, and mechanism adapted to contact the end of the mandrel and to enter said recess at desired intervals to crease the folds of the shell, substantially as described.

39. In a shell making machine, the combination of a mandrel to form the body of the shell and provided with a recess at one end thereof, mechanism for folding the bottom of the shell over the end of the mandrel, and a piston adapted to strike against the end of the mandrel and to enter said recess to crease the folds, substantially as described.

40. In a shell making machine, the combination of a mandrel to form the body of the shell and provided with a recess at one end thereof, mechanism for folding the bottom of the shell over the end of the mandrel, a reciprocating piston adapted to strike against the folds of the shell and to enter said recess, and a removable head on said piston corresponding to the size of the recess, substantially as described.

HIRAM P. HALL.

In presence of—
CLIFFORD N. WHITE,
SAMUEL E. HIBBEN.